Jan. 28, 1941. J. C. HUBKA 2,229,893
GAS SAFETY VALVE
Filed June 10, 1940
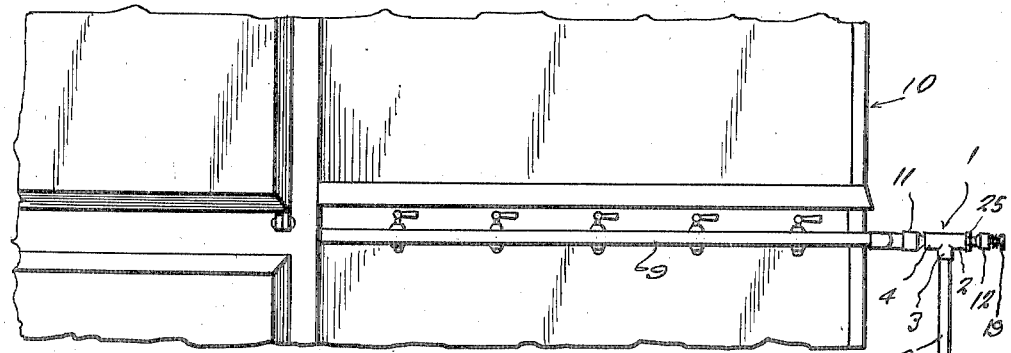
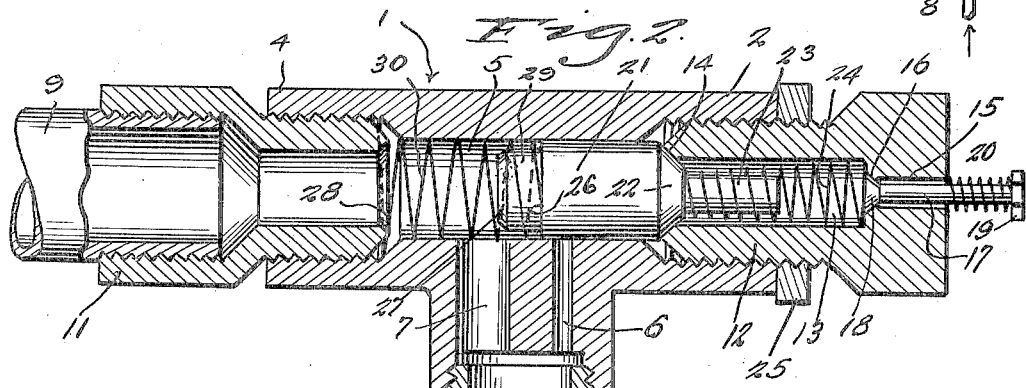
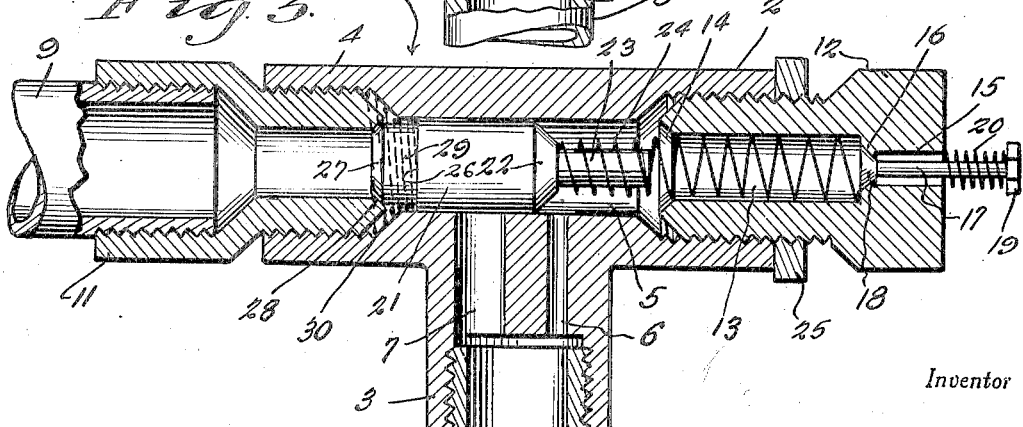
Inventor
Jack Charles Hubka
By Clarence A. O'Brien
Attorney Patented Jan. 28, 1941

2,229,893

UNITED STATES PATENT OFFICE 2,229,893

GAS SAFETY VALVE

Jack Charles Hubka, Greggton, Tex.

Application June 10, 1940, Serial No. 339,811

1 Claim. (Cl. 137—153)

The present invention relates to new and useful improvements in gas safety valves and has for its primary object to provide, in a manner as hereinafter set forth, a device of this character which will automatically close and remain closed should the gas in the line fall below a predetermined pressure.

Another very important object of the invention is to provide a safety valve of the aforementioned character embodying a novel construction and arrangement whereby the pressure of the gas is utilized both for assisting in maintaining the valve open as well as closed.

Still another important object of the invention is to provide an automatic low pressure gas safety valve which may be conveniently adjusted or regulated as desired to function at different pressures.

Other objects of the invention are to provide an automatic low pressure gas safety valve which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is an elevational view, showing a safety valve constructed in accordance with the present invention installed in a gas line to a range.

Figure 2 is a view in vertical longitudinal section through the valve, showing said valve open.

Figure 3 is a vertical longitudinal sectional view, showing the valve closed.

Referring now to the drawing in detail, it will be seen that the embodiment of the invention which has been illustrated comprises a substantially T-shaped body of suitable metal which is designated generally by the reference numeral 1. The body 1 includes a branch 2, an inlet branch 3 and an outlet branch 4. Further, the body 1 is formed to provide a cylinder 5 extending between the longitudinally aligned branches 2 and 4. The inlet branch 3 communicates with the cylinder 5 through a pressure passage 6 and a comparatively large inlet passage 7. The branch 3 is adapted to threadedly receive the pipe line 8. A line 9 to a gas range 10 is connected to the branch 4 through the medium of a reducing coupling 11 which is threaded into said branch 4.

Threadedly mounted for adjustment in the branch 2 of the body 1 is a plug 12 having a chamber 13 extending longitudinally thereinto from the inner end thereof. The inner end of the plug 12 is formed to provide a valve seat 14. Communicating with the chamber 13 is a vent 15 in the form of a longitudinal passage in the outer portion of the plug 12, the inner end portion of said vent being formed to provide a valve seat 16. Slidable in the vent passage 15 is a loosely mounted stem 17 having a valve head 18 on its inner end engageable with the seat 16 for controlling said vent 15. A nut 19 is provided on the outer end portion of the stem 17. A coil spring 20 on the stem 17 is engaged with the nut 19 for seating or closing the valve 18.

Slidably mounted in the cylinder 5 is a piston type valve 21. The valve 21 comprises a substantially conical end portion 22 which is engageable with the seat 14. Projecting from this end of the valve 21 is a longitudinal pin 23. The pin 23 maintains one end of a coil spring 24 in the chamber 13 in proper engagement with the adjacent end of the valve 21. Tension of the spring 24 is regulated through the medium of the plug 12. A lock nut 25 secures the plug 12 in adjusted position.

The other end portion of the valve 21 is reduced in a manner to provide a shoulder 26. This reduced portion of the valve 21 terminates in a cone 27 which is engageable on a seat 28 provided therefor on the inner end of the coupling 11. A coil spring 30 encircles the reduced portion 29 of the valve 21 and has one end engaged with the shoulder 26. The other or outer end of the spring 30 is enlarged and adapted to seat on the inner end of the coupling 11.

In operation, and under normal conditions, the valve 21 is maintained in open position by the spring 30 with the assistance of the gas pressure in the line, as seen in Fig. 2 of the drawing. With the valve 21 in this position it will be observed that the passage 6 is closed by said valve and that the passage 7 is open. Thus, the gas is free to flow from the line 8 through the passage 7 into the cylinder 5 and then through the coupling 11 and the line 9 to the range 10. Now, should the gas pressure go off, the valve 21 is actuated by the spring 24 in a manner to close the passage 7 and open the passage 6 against the tension of the spring 30. However, the movement of the valve 21 at this time is not sufficient to engage said valve with the seat 28. When the pressure comes on again the gas flows through the passage 6 and assists the spring 24 to engage the valve 21 with the seat 28 against the tension of the spring 30. The valve 21 is maintained in this fully closed position by the combined pressure of the gas and the spring 24 until the chamber 13 is vented by manually opening the valve 18. When the gas is thus permitted to escape from the chamber 13 through the passage 15 the spring 30 actuates the valve 21 in a manner to again close the passage 6 and open the passage 7. The gas now reenters the cylinder 5 through the passage 7 and assists the spring 30 in returning the valve 21 to fully open position in engagement with the seat 14 and against the tension of the spring 24.

It is believed that the many advantages of an automatic low pressure gas safety valve constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A safety valve of the character described comprising a body adapted to be interposed in a gas line and including aligned branches, and an inlet branch, one of the aligned branches constituting an outlet, a cylinder in the body connecting the aligned branches, an adjustable plug threadedly mounted in the other of the aligned branches and having a chamber therein, said plug further having a vent passage therein communicating with the chamber, a valve controlling the vent passage, a seat on the inner end of the plug, a coupling threadedly engaged in the outlet branch and including a seat on its inner end, the body further having spaced, parallel passages therein connecting the inlet with the cylinder at longitudinally spaced points in said cylinder, a valve slidable in the cylinder and adapted to alternately open and close the passages, the last named valve being engageable with the seats, a coil spring mounted in the plug for yieldingly urging the last named valve in one direction, and a second coil spring engaged with the last named valve for yieldingly urging same in the opposite direction.

JACK CHARLES HUBKA.